April 28, 1970   W. C. MOORE ET AL   3,509,561
INDICATING MEANS FOR INFORMATION INPUT
Filed Oct. 12, 1966   2 Sheets-Sheet 1

INVENTORS
WILLIAM C. MOORE AND
WILLIAM S. PILGRIM
BY Bruns & Jenney, ATTYS.

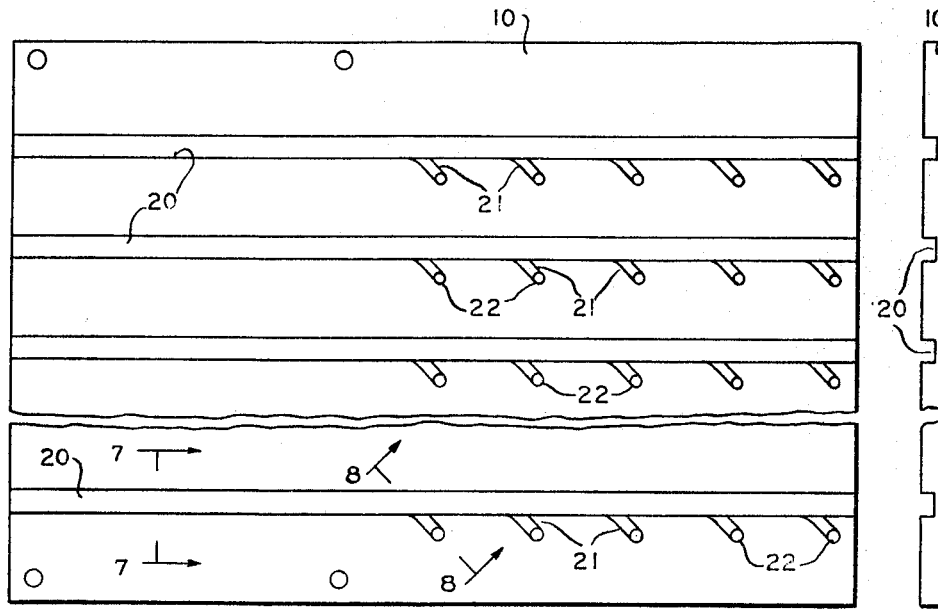
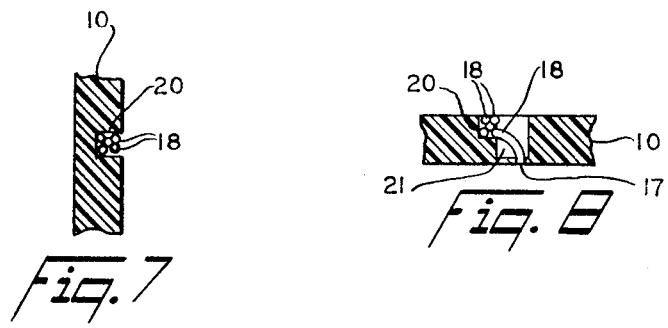

United States Patent Office 3,509,561
Patented Apr. 28, 1970

3,509,561
INDICATING MEANS FOR INFORMATION INPUT
William C. Moore, Skaneateles, and William S. Pilgrim, Port Byron, N.Y., assignors to Welch Allyn, Inc., Skaneateles Falls, N.Y., a corporation of New York
Filed Oct. 12, 1966, Ser. No. 586,073
Int. Cl. G08b 5/36
U.S. Cl. 340—380                                2 Claims

ABSTRACT OF THE DISCLOSURE

A device for causing information to be entered into data processing apparatus at another location, and for indicating to the opreator that the apparatus has received the correct signl. The device includes an indicator panel having a plurality of information representations and switching means for each representation actuable to cause that information to be fed into the processing apparatus. Each information representation also has an associated fiber optic indicator assembly that is arranged to give the operator visual indication that the information signal has been received.

---

This invention relates generally to indicating devices, and has special reference to a novel device particularly adapted for indicating that signals to feed information into a machine, which may be remote from the indicating device, have in fact been received.

Briefly stated, the invention contemplates an indicating panel at least a portion of which is divided into a number of sections with a representation of some type of information being shown in each section. In addition to showing an information representation, each section of the panel includes a signal receiving means and an indicator element in the form of an optical fiber.

When an operator using the device of the invention wishes to have the information that is represented in a particular panel section fed into a computer or other information storage device, he gives a signal to the signal receiving means for that section and this causes the information to be entered. In accord with the invention, the receipt of the operator's signal by the receiving means on the panel also causes the end of the optical fiber for the section to become illuminated and this tells the operator that his signal has been received by the indicator device and transmitted to the computer. In this manner, the operator can verify that the computer is being fed all of the information he wishes entered into it.

It may be stated, therefore, that the primary object of the present invention is to provide a relatively simple means for indicating information input to an operator.

Another important object of the invention is to provide an indicating device of the character described which utilizes a very small but effective visual indicator means.

A further object is to provide an indicator device of the character described having a simple, compact and economical construction.

Still another object is to provide an indicator device having broad utility in verifying the receipts of signals.

A more specific object is to provide an indicator device of the character described that employs illuminable optical fibers for the indicator elements.

Other objects and advantages of the invention will become apparent from the following detailed description thereof, read in conjunction with the accompanying drawings which illustrate a representative embodiment of the invention for the purpose of disclosure.

In the drawings:

FIGURE 5 is a fragmentary rear elevation of the device of FIGURE 1;

FIGURE 6 is a fragmentary end elevation of the device;

FIGURE 7 is an enlarged vertical section taken substantially on line 7—7 of FIGURE 5; and FIGURE 8 is an enlarged sectional view taken substantially on line 8—8 of FIGURE 5.

Referring now to these drawings, wherein like reference numbers designate the same part in each of the views, 10 indicates the main panel of the device which is a rigid plate of suitable plastic material such as clear acrylic. A portion of this panel is divided into squares 11 as by lines 12 painted or etched on the plate, or the dividing means can be narrow ridges molded on the plate, or the like. The manner of dividing the panel into sections such as the squares is unimportant so long as the different sections are clearly distinguishable to an operator viewing the panel from one side.

Figure 1:
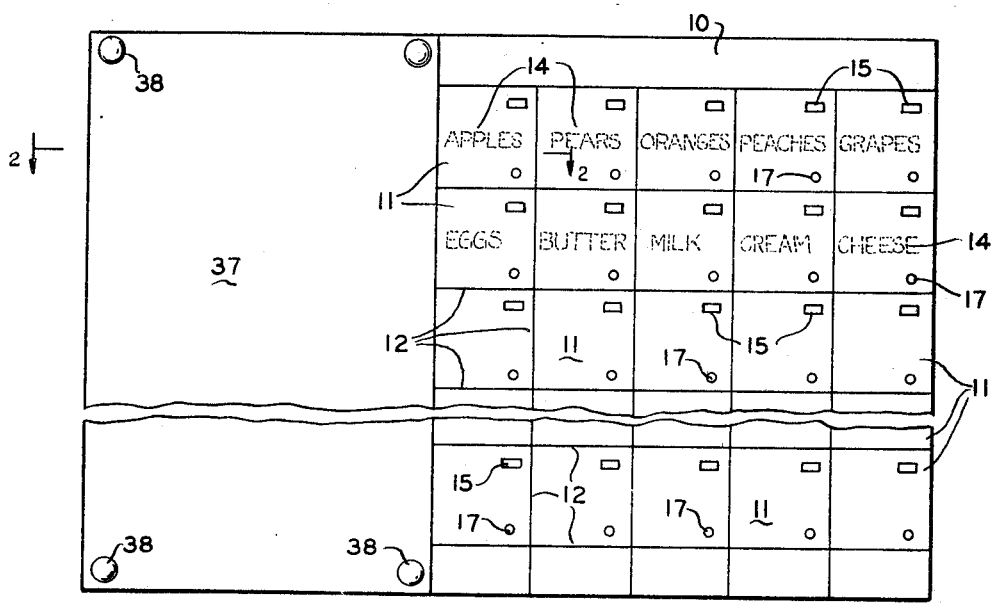
FIGURE 1 is a fragmentary front elevation of an indicating device embodying the invention.

As shown in FIGURE 1, each panel square will have therein lettering, numbers or symbols comprising a representation of certain information it may be desired to selectively enter into a computer or other storage device. As an example, the information representations may be the names, as indicated at 14, of commodities that a storekeeper may wish to order or have inventoried. The information representations can also be numbers or formulas that an operator may wish to enter into a computer, or symbols representing functions the operator might want the computer to perform.

One possible use of the device of the invention is where the sectional portion of panel 10 serves as the screen of a microfilm reader type device. In such an application, the information on the microfilm would be projected on the side of the panel opposite the viewing side, and the dividing lines 12 could be projected onto the panel as well as the representations of the information being dealt with.

In addition to the information representations 14, each panel square 11 includes a signal receiving means, indicated by an element 15, and an indicator means 17 comprising the polished end or ends of one or more optical fibers. The element 15 can be a magnetic core which can receive a signal by having its flux changed, or it can simply be an electrical contact which can receive a signal by being engaged by another electrical contact whereby a switch is closed. In either case, the core or contact is operatively connected to a computer or the like so that when a signal is received by the element 15 of a particular square, the information represented by that square will be entered in the computer.

Signals are selectively given to the signal receiving element 15 by the operator who would use, in the case of magnetic cores, a pointer having a permanent magnet at the end thereof whereby touching a core with the pointer will cause the flux of the core to change. If the elements 15 are electrical contacts, the same result is achieved by providing the operator with an insulated pointer connected in a circuit so that touching a contact with the pointer closes a switch. In either case, when a signal is received by one of the elements 15, the indicator means 17 in the same square will light up to verify this fact to the operator.

The optical fibers for the indicator means 17 are the well known clad glass or plastic fibers that transmit light from end to end with minimum light loss. While several such fibers molded into a small bundle can be used for the indicator means, for simplicity the invention will be described as though there is but one fiber 18 for each square 11, one optically polished end of the fiber forming the indicator means 17 for the square.

In the embodiment of the invention shown, the fibers 18 for each row of squares 11 are grouped together and carried in shallow channels or grooves 20 in the back of the panel. Near a corner of each square a deeper slot 21 extends out from the main channel at an oblique angle thereto, and at its outer end each slot communicates with a hole 22 at right angles to the front and back surfaces of the panel. An end of one of the fibers extends into each hole 22 and terminates flush with the front or viewing side of the panel to form the indicator means. As will be readily understood, the oblique angle, length and depth of the slots 21 are such that the fibers will not have to be bent too sharply.

Figure 2:
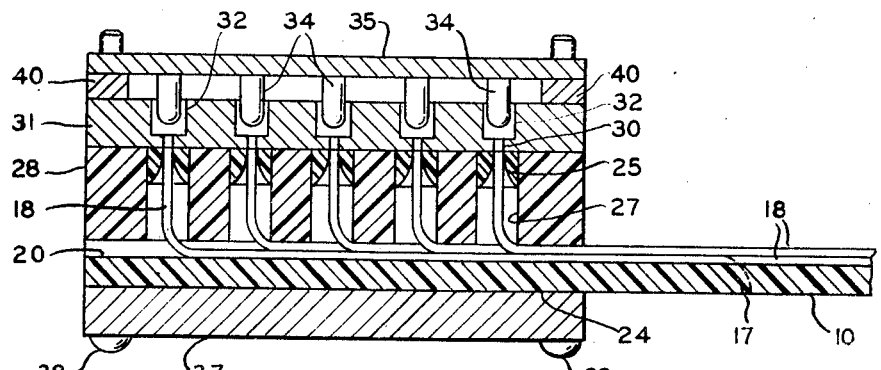
FIGURE 2 is an enlarged horizontal section through one side of the device, taken substantially on line 2—2 of FIGURE 1.
Figure 4:
FIGURE 4 is a greatly enlarged cross sectional view of an adaptor used with the optical fibers.
Figure 3:
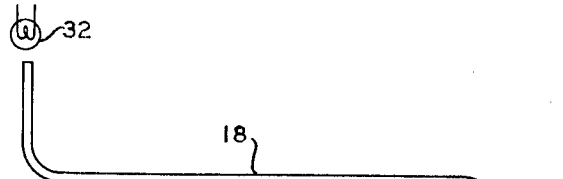
FIGURE 3 is a top plan view of one of the fiber optic indicator elements and its light source.

The group of fibers 18 for each row of panel squares are carried away from the sectioned portion of panel 10 to an unsectioned portion 24 where their free ends are turned at substantially right angles away from the panel as best shown in FIGURE 2. The fiber ends are secured as by an epoxy cement in cylindrical adapters 25, and the latter are mounted in the outer ends of evenly spaced bores 27 in a spacer block 28. The adapters permit the optically polished ends of the fibers to be positioned in coplanar relation to one another and in flush relation to the outer surface of the spacer block. As indicated in FIGURE 2, the ends of the individual fibers of a row group are bent away from the panel at evenly spaced intervals so that one fiber occupies each bore 27, this pattern being followed for the fiber group for each row of squares.

The fiber ends are arranged to be in registry with small bores 30 in a cover plate 31 which abuts against the outer surface of the spacer block 28. The bores 30 lead into counterbores 32 which receive a bank of miniature lamps 34 mounted on a base plate 35. The major portion of the lamps are received in the bores 32 of the cover plate which serves as a light shield so that the light from any given lamp can only enter the end of its corresponding fiber and not that of any adjacent fiber. In addition to acting as a light shield, the cover plate 31 also serves as a heat sink for the lamps, and the counterbores 32 operate to properly center them.

A plate 37 of the same dimensions as the spacer block 28 and plates 31 and 35 is mounted on the front or viewing side of the panel 10 to shield the light bank and other associated parts from view. All of these plates and block 28 are secured together as by bolts 38, the plates 31 and 35 being separated by spacer members 40 shown.

Each lamp 34 is electrically connected to the signal receiving element 15 of the panel square for which the end 17 of the fiber corresponding to the lamp acts as the indicator means. Accordingly, when an element 15 receives a signal from the operator, this can cause its corresponding lamp to light immediately whereby a bright light is emitted by the corresponding fiber end 17 to visually indicate receipt of the signal. In the alternative, with slightly different circuitry, the lights can be arranged to remain unlit until the operator has given a signal to all of the panel squares he has selected for an information input. In such case, a scanning circuit can be subsequently employed to determine which squares have received signals and light the corresponding lamps whereby the indicator means for the selected squares will be illuminated simultaneously.

From the foregoing description it will be apparent that the invention provides a novel and highly useful means for indicating to an operator the receipt of information input signals by an information storage device.

What is claimed is:

1. In an information input indicating device, an indicating panel adapted to be viewed from one side, means dividing said panel side into a plurality of separate coplanar sections arranged in rows, a signal receiving means in each section, at least one optical fiber for each section having an end positioned in the section and visible from the viewing side of the panel, and means responsive to the receipt of a signal by the signal receiving means for each section to put light into the other end of the fiber for the section whereby light is emitted from the fiber at the viewing side of the panel to indicate to a viewer that a signal has been received, the optical fibers for all of the sections in a row being grouped together on the side of the panel opposite the viewing side and extending to a location spaced from the panel sections, said opposite panel side being formed with channels in which said fiber groups for the section rows are respectively positioned.

2. An information input indicating device comprising an indicating panel one side of which is adapted to be viewed by an operator, means dividing a portion of said one panel side into a plurality of clearly distinguishable surface areas each having an information representation thereon, the surface areas being arranged in rows, a signal receiving means for each surface area, an optical fiber for each surface area, the optical fibers for the areas in each row being grouped together on the side of the panel opposite the viewing side and extending along said opposite side away from the areas to another portion of the panel, the panel side opposite the viewing side being formed with a channel for each row of surface areas, the grouped fibers for each row being secured in its respective channel, each of said fibers having one of its ends extending into the surface area at substantially right angles thereto so as to be visible to the operator, the other end of said fiber being spaced from the surface area away from the viewing side of the panel, a normally unlighted light source directly adjacent the other end of said fiber, the signal receiving means for an area being given a signal by the operator when it is desired to feed the information represented on the area into an information storage device, and means responsive to the receipt of a signal by the signal receiving means of an area to light the light source adjacent the fiber for the area whereby light is emitted from the end of the fiber that is visible to the operator to indicate to him that the signal has been received.

References Cited

UNITED STATES PATENTS

| | | | |
|---|---|---|---|
| 2,554,580 | 5/1951 | Le Goff | 340—380 |
| 2,678,431 | 5/1954 | Lewis | 340—380 X |
| 2,998,597 | 8/1961 | Edwards | 340—380 X |
| 3,360,657 | 12/1967 | Shlesinger | 250—227 |
| 3,272,174 | 9/1966 | Pribonic | 340—380 X |

JOHN W. CALDWELL, Primary Examiner

C. M. MARMELSTEIN, Assistant Examiner

U.S. Cl. X.R.

250—227; 350—96